United States Patent [19]

Hugg

[11] 4,039,147
[45] Aug. 2, 1977

[54] SPRAYING APPARATUS

[76] Inventor: Richard C. Hugg, Westside, Iowa 51467

[21] Appl. No.: 654,562

[22] Filed: Feb. 2, 1976

[51] Int. Cl.² ............... B05B 1/20; A01G 25/09
[52] U.S. Cl. ..................................... 239/167; 239/172
[58] Field of Search ............... 239/159, 161, 163-169, 239/172, 175

[56] References Cited

U.S. PATENT DOCUMENTS

| 1,043,929 | 11/1912 | Heard | 239/167 |
| 1,159,343 | 11/1915 | Gailor | 239/164 |
| 2,590,677 | 3/1952 | Broyhill | 239/167 |
| 2,965,304 | 12/1960 | Krause | 239/166 |
| 3,329,030 | 7/1967 | Dijkhof | 239/167 X |
| 3,581,993 | 6/1971 | Reams | 239/167 |
| 3,904,118 | 9/1975 | Farmery | 239/175 X |

FOREIGN PATENT DOCUMENTS

| 609,334 | 9/1948 | United Kingdom | 239/167 |
| 587,484 | 4/1947 | United Kingdom | 239/167 |

Primary Examiner—John J. Love
Assistant Examiner—Andres Kashnikow
Attorney, Agent, or Firm—Henderson, Strom & Sturm

[57] ABSTRACT

A spraying apparatus of a type for dispensing a liquid chemical to crop land. A trailer adapted to be connected to a prime mover includes a frame attached thereto. A parallelogram actuating mechanism is provided for vertically adjusting the position of the frame and thereby spraying apparatus connected thereto with respect to the trailer and thereby with respect to the ground. A pair of folding spraying booms having spray nozzles thereon are pivotally connected to each side of the frame and an actuating mechanism is provided for moving the booms between an extended position for spraying and a retracted position folded along side the trailer for transporting from place to place.

12 Claims, 10 Drawing Figures

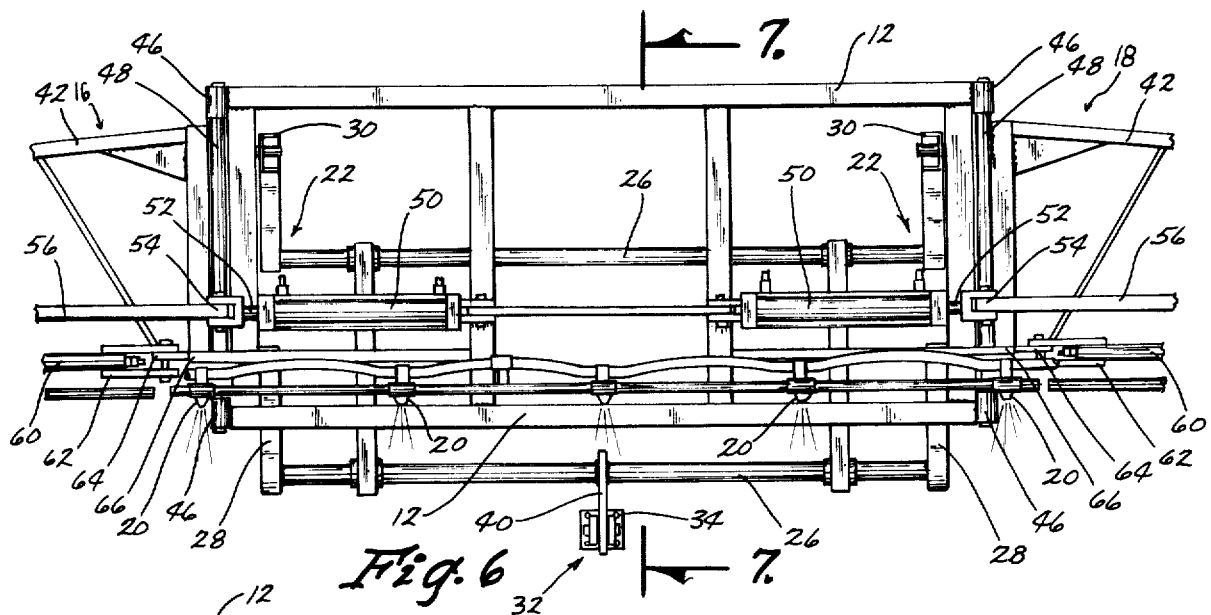
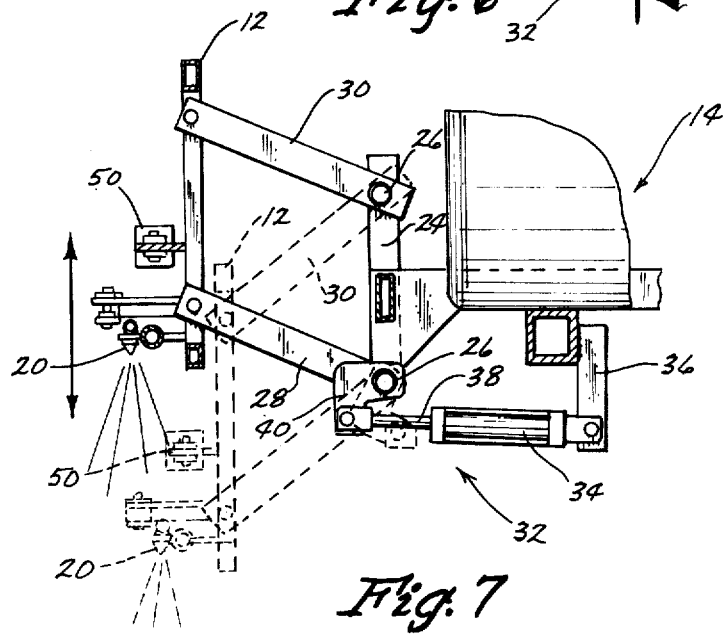
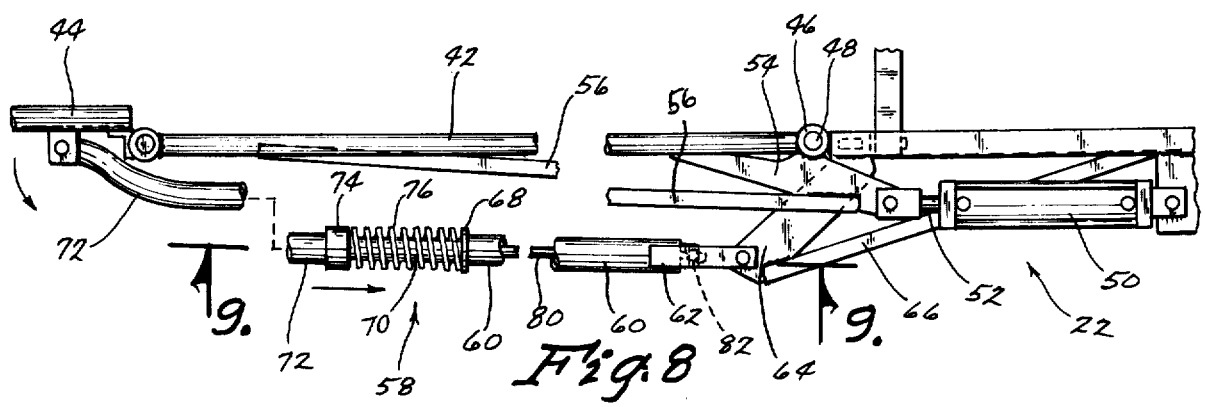

SPRAYING APPARATUS

BACKGROUND OF THE INVENTION

The present invention relates generally to a crop spraying apparatus and more particularly to a hydraulically controlled spray boom apparatus.

A typical technique for spraying liquid chemicals such as fertilizers and insecticides to crops uses an applicator vehicle having a storage tank mounted thereon. A spray boom is mounted either on the applicator vehicle or on a tractor pulling the applicator vehicle. This spray boom has a number of spray nozzles mounted thereon in a series relationship. A pump is generally attached to the tractor by the use of a power take-off coupler and torque-arm assembly for transferring the chemical from the storage tak to the spray nozzles, thereby expelling the liquid from the nozzles in a spray form.

The applicator vehicle is typically a two wheel or tandem axle trailer which is towed by a tractor. Past experience has shown that the mounting of all or part of the equipment directly on the tractor generally is not desirable. This is partially because of the increased time required for the mounting and removing of the equipment from the tractor. Furthermore, with the spraying equipment on the tractor, its use for other purposes is severely limited.

With the increase in the amount of land being tilled by the average farmer, there is a definite need to increase the efficiency of the farmer, thereby increasing the amount of land which can be tilled per hour. In the past few years, this has been brought about in the crop spraying art by simply increasing the length of the booms, thereby, increasing the area covered in a single trip across the field.

However, a number of problems are encountered when the booms become of excessive length. Since it is necessary to move the spraying apparatus from one field to another, the spraying equipment must be able to pass through typical farm gates and travel upon public roads. Therefore, the spray booms must be movable to a position different from their normal spraying position, otherwise the apparatus would not pass through gates or be able to travel upon public roads.

Various arrangements have been devised to stow the boom for road travel. However, these structures all have certain drawbacks which make road travel difficult. For example, raising the booms to a vertical position prevents the vehicle from traveling under low hanging objects such as power lines and bridges. Swinging the booms to the rear of the implement creates a serious hazard to other vehicles on the road, while also impairing maneuverability of the implement. Further, removing the booms from the implement for transporting from place to place is undesirable because it is time consuming. Swinging the booms forwardly and inwardly along the vehicle is also often undesirable because many times the overall length of the boom is greater than the length of the vehicle. In such cases, the booms often extend beyond the front of the vehicle to seriously interfere with the maneuverability of the tractor. In some cases, booms have been designed which swing inwardly along side the vehicle as the boom is raised thus making it possible for it to pass over or be positioned above the rear tires of the tractor in a transport position. However, this latter design may present a serious safety hazard to the operator of the tractor, since the tractor many times has to turn sharply and maneuver in tight areas. Further, if the booms are not lifted, they must extend past the outer sides of the oversized tires which are usually used on a spraying vehicle. This results in a lateral width which is hazardous for road travel as well as further reducing the maneuverability of the tractor.

Another problem associated with booms when they are of considerable length involves the instability of the outboard ends of the boom. The vehicles carrying the booms, under normal operating conditions, will encounter ruts, holes, contour terraces and the like, causing uneven travel of the vehicles. This results in jarring and whipping of the boom, which will disrupt the application rate of the liquid and possibly damage the booms. The problem may be solved when shorter booms utilized or when the tank carrying vehicle is operated at a lower speed, but both of these conditions will decrease the efficiency of the farmer.

Often times it is desirable to quickly change the height of the boom while passing over the plants. The need for the change is brought about by a change in the contour of the land and/or different corn heights. Presently, the common methods available for accomplishing this involve a time consuming task of manually readjusting the brackets supporting the boom, thereby physically moving the boom to the desired height.

SUMMARY OF THE INVENTION

In accordance with the present invention of a spraying apparatus, a frame is pivotally coupled to a farm implement by connecting elements. A vertical adjusting device is connected between the farm implement and the connecting elements for adjusting the vertical position of the frame with respect to the farm implement.

A first elongated member is pivotally connected along a vertical axis at one end thereof to one side of the frame. A second elongated member is pivotally connected along a vertical axis at one end thereof to the other end of the first elongated member. Spraying devices are attached to the first and second members for spraying a fluid therefrom in a conventional manner.

An actuating unit including an adjustable device is pivotally connected at one end to the frame and at the other end thereof to the first elongated member through a lever arrangement positioned on the first elongated member. The actuating unit further includes a strut member pivotally connected to the frame and to the second elongated member. The adjustable device moves the first and second elongated members between an extended position used for spraying, wherein the members extend in a direction transverse to the normal direction of travel of the apparatus and a retracted position whereby the first and second members are folded together and are each substantially in line with the direction of movement of the spraying apparatus for transportation. The actuating unit further includes a biasing device on the strut member for biasing the second member to the extended position when the adjustable device is in a first position and baising the strut member in the retracted position in a second position of the adjustable device.

An object of the present invention is the provision of a spraying apparatus having a pair of elongated booms mounted on a farm implement with each of the booms being foldable midway through their length against themselves and alongside the farm implement.

Another object is to provide a spraying apparatus having booms which are adjustable vertically with respect to the farm implement and adjustable horizontally between a spraying and a transport position.

A further object of the invention is the provision of apparatus connected to the booms to absorb shocks to the booms and to stabilize the outer ends thereof.

Still another object is to provide a spraying apparatus which can be vertically adjusted or moved between spraying and transport positions by the use of controls positioned adjacent to the operator of the spraying apparatus.

Other objects, advantages, and novel features of the present invention will become apparent from the following detailed description of the invention when considered in conjunction with the accompanying drawings.

BRIEF DESCRIPTION OF THE DRAWINGS

FIG. 6 is an enlarged partial rear view taken along line 6—6 of FIG. 5;

FIG. 7 is a cross-sectional view taken along line 7—7 of FIG. 6, with solid lines illustrating an elevated position thereof and dashed lines illustrating a lowered position thereof;

FIG. 8 is a partial enlarged top view of the actuating mechanism of a boom in an extended position;

DESCRIPTION OF THE PREFERRED EMBODIMENT

Figure 1:
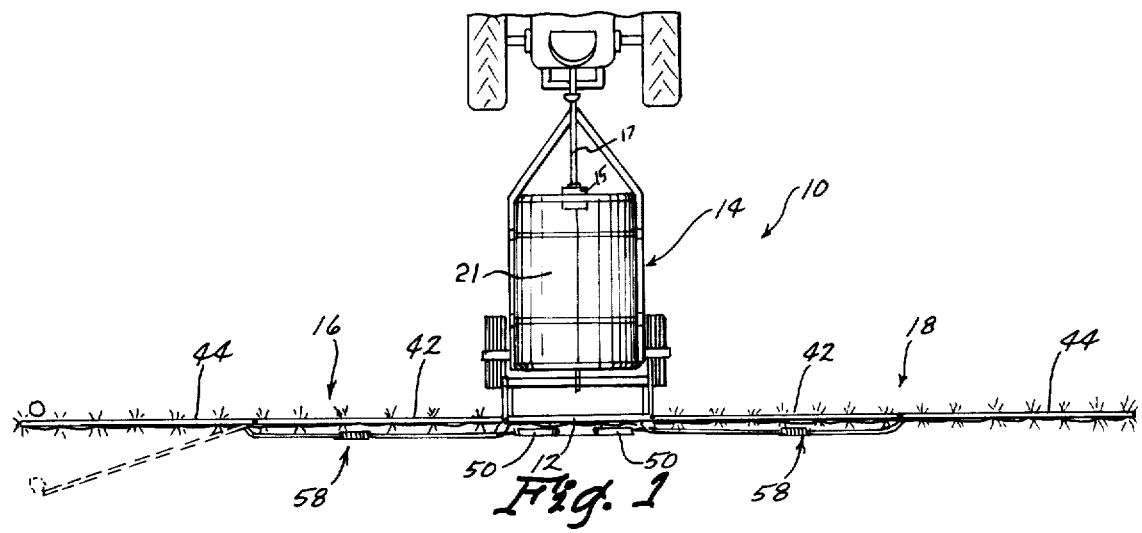
FIG. 1 is a plan view of the spraying apparatus in a spraying position coupled to a farm implement.

Referring now to the drawings wherein like reference numerals designate identical or corresponding parts throughout the several views, FIG. 1 illustrates a spraying apparatus 10 constructed according to the present invention.

Figure 2:
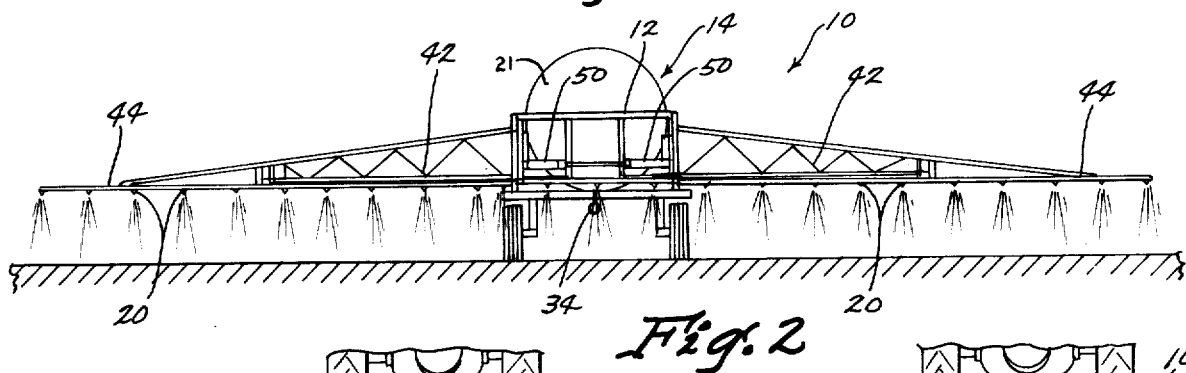
FIG. 2 is a rear view of the present invention.
Figure 5:
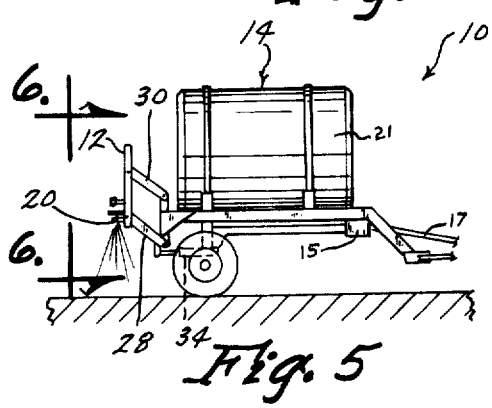
FIG. 5 is a side elevational view of the invention in the extended position as shown in FIG. 1.
Figure 9:
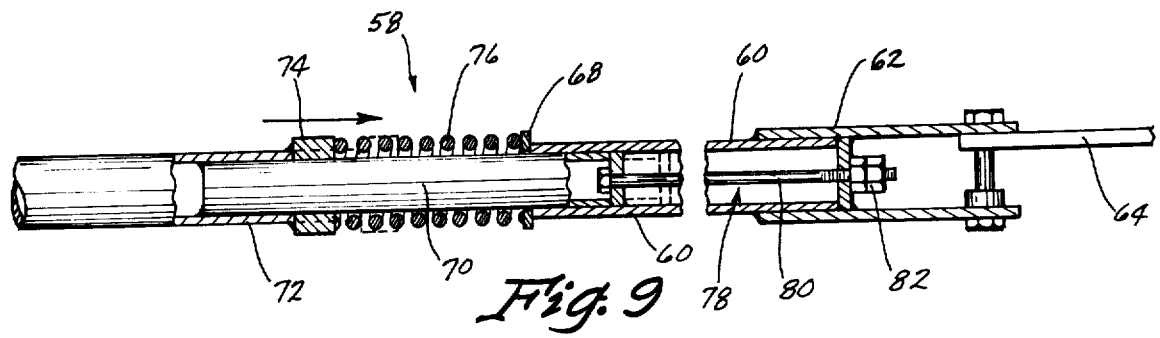
FIG. 9 is a partial enlarged cross-sectional view taken along line 9—9 of FIG. 8.

As illustrated in FIGS. 1 and 2, the spraying apparatus 10 includes a frame 12 which is mounted on the rear of a farm implement 14. A pump 15 is rigidly mounted to the farm implement 14 and driven by a power take-off shaft 17. A first boom 16 and a second boom 18 are pivotally mounted on the outward ends of the frame 12. The first and second booms 16 and 18 respectively are virtual mirror images of each other and are attached to opposite ends of the frame 12. Spraying devices 20 (FIGS. 2, 5, and 7), attached to the first and second booms 16 and 18 respectively receive and apply the liquid chemical as it is delivered from a storage tank 21 by the pump 15. Actuating units 22 (FIGS. 6 and 8) are each pivotally fastened at one end to the frame 12 and at the other end to the booms 16 and 18 respectively.

Specifically, the frame 12 (FIG. 7) forms one vertical side of a parallelogram. The other vertical side of the parallelograms includes a pair of upright supports 24 which are rigidly secured to the farm implement 14. A pair of parallel horizontal cross-members 26 are rigidly affixed to one end of levers 28 and 30. The cross-members 26 have a length approximately the same as that of the frame 12 and are rotatably supported in a spaced relationship by the upright supports 24. Levers 28 and 30 are pivotally coupled to the ends of the frame 12.

An adjusting unit 32 (FIGS. 6 and 7) has one end of a double-acting hydraulic cylinder 34 pivotally secured to the farm implement 14 through a coupling element 36. The piston rod 38 of the cylinder 34 is pivotally coupled to one of the cross-members 26 through lever 40. The lever 40 is rigidly secured to the lower cross-member 26, and as the piston rod 38 moves out from the cylinder 34, the lever 40 will be displaced and cause the lower cross-member 26 to rotate in a clockwise direction. As the lower cross-member 26 rotates, the levers 28 will be displaced upwardly, thereby raising the frame 12. When the piston 38 is retracted into the cylinder 34, the lever 40 will rotate the lower cross-member 26 in a counter-clockwise direction, thereby causing the levers 28 to move downwardly, resulting in the frame 12 being displaced downwardly. This structure allows the relative vertical position of the frame 12 with respect to the farm implement 14 and the ground to be remotely controlled by the operator by merely controlling the effective length of the piston 38.

The first and second booms 16 and 18 (FIGS. 1, 2, and 6) respectively each include a first and second elongated member 42 and 44 respectively. The first members 42 are pivotally connected to the ends of the frame 12 about vertical axes. The pivotal connections (FIG. 6) are made through a collar 46 mounted on the ends of the frame 12 at the top and bottom thereof. A rod 48 is rigidly secured to the first members 42 and extends beyond the top and bottom, thus passing through the collar 46.

Figure 3:
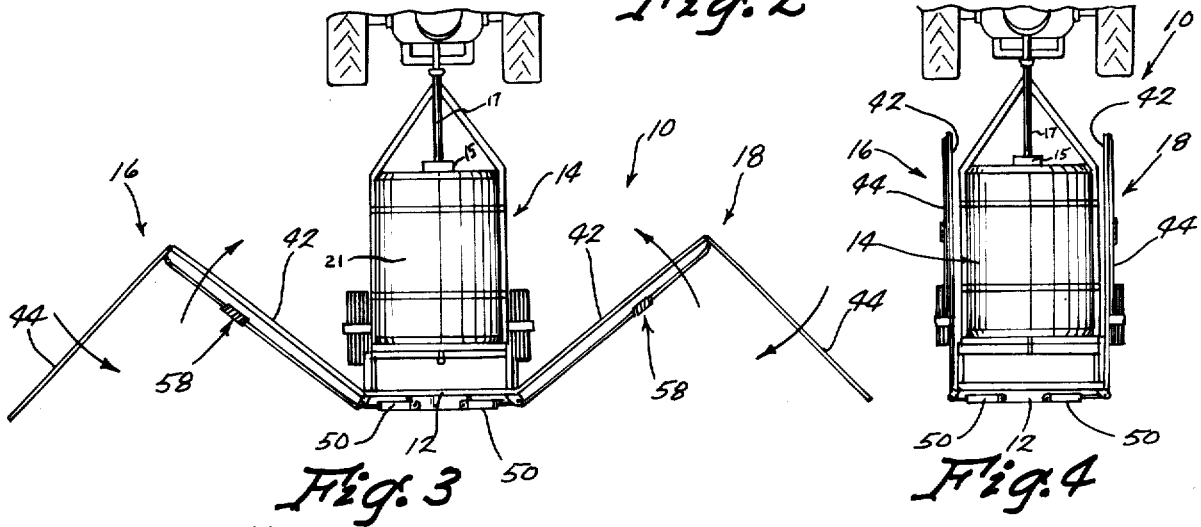
FIG. 3 is a plan view illustrating the booms midway between an extended position and a retracted position, with arrows illustrating the direction of movement of each element of the booms as it is moved to the retracted position.
Figure 4:
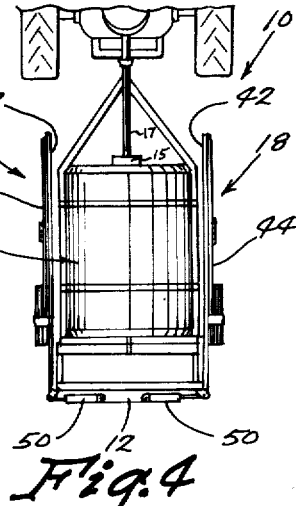
FIG. 4 is a plan view of the spraying apparatus with the booms in a retracted position.

The first and second members 42 and 44 respectively are pivotally connected together thereby permitting the second members 44 to fold against the first members 42 as is illustrated in FIGS. 3 and 4.

The actuating units 22 (FIGS. 6–10) include a double-acting hydraulic cylinder 50 having one end pivotally attached to the frame 12. A piston rod 52 is pivotally coupled to the first members 42 through a strut bracket 54 which is rigidly secured to the first members 42. A brace 56 is rigidly connected to the strut bracket 54 at one end and to the first members 42 at the other end. The actuating units 22 further include a biasing device 58 which is pivotally connected at one end to the frame 12 and at the other end to the second members 44.

The biasing device 58 of strut means 78 (FIGS. 8–10) includes a first outside tubular member or second portion 60 having one end rigidly secured to an end section 62. The end section 62 is pivotally connected to the frame 12 through a strut bracket 64 which is rigidly secured to the frame 12. A brace 66 (FIGS. 8 and 10) is rigidly connected to the strut bracket 64 at one end and to the frame 12 at the other end thereof, for the purpose of strengthening the connection between the strut bracket 64 and the frame 12. The opposite end of the member 60 has a spring flange or abutment portion 68 extending around its outside edge. A tube 70 having a diameter slightly less than the inside diameter of member 60 is located within member 60 and extends beyond the end thereof. A second outside member 72 is rigidly secured to the tube 70 and pivotally secured to the second members 44. The tubes 70 and 72 are collectively referred to as the first portion of strut means 78. A second spring flange or abutment member 74 is formed around the outside edge of tube 70. A spring element 76 is disposed around the outside of tube 70 and between the two spring flanges 68 and 74. The spring element 76 exerts an outward force on the second member 72. The amount of force exerted by the spring element 76 may be adjusted by increasing or decreasing the distance between the two spring flanges 68 and 74. This distance is controlled by a folding adjustment device 78 (FIGS. 9 and 10) which includes a threaded rod 80 having one end rigidly secured to the tube 70 and the other end adjustably secured to the end section 62 by a nut assembly 82.

With the first and second booms 16 and 18 respectively in the normal spraying position as illustrated in FIGS. 1 and 2, the piston 52 of the actuating units 22 is retracted into the cylinder 50. As the piston rod 52 (FIG. 8) retracts into the cylinder 50, the strut bracket 54 and the brace 56 to which the piston 52 is connected, will pull the first members 42 to a position approximately parallel to the frame 12 and perpendicular with respect to the farm implement 14. As the first members 42 move into position, the biasing devices 58, through the spring element 76, exert an outwardly directed force on the second members 44. This directed force causes the second members 44 to unfold by pivoting about their connection to the first members 42 and assume the normal spraying position as is illustrated in FIG. 1.

Figure 10:
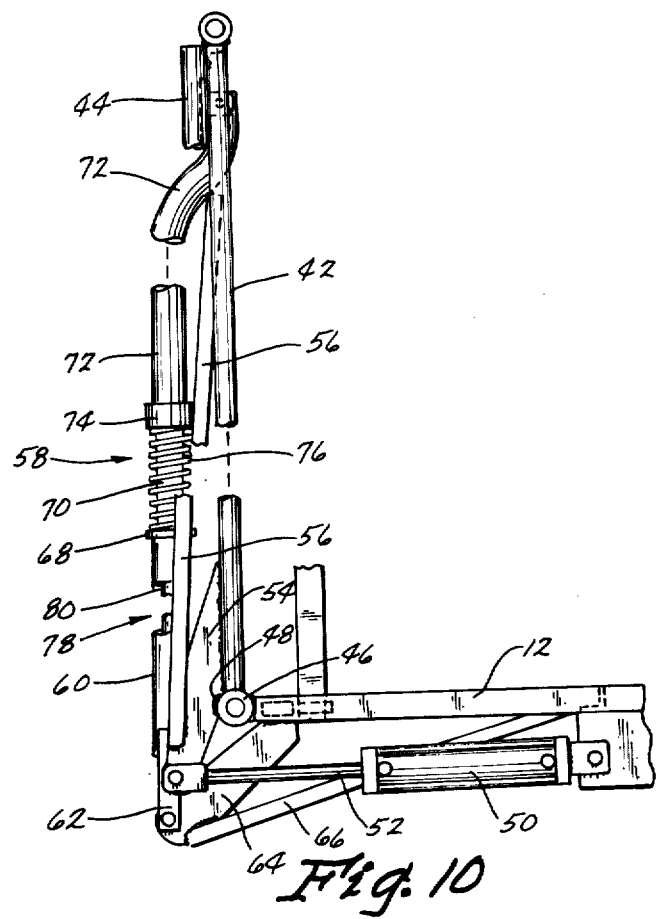
FIG. 10 is an enlarged partial view of the actuating mechanism as shown in FIG. 8, but showing the boom in a retracted position.

As the piston 52 of the actuating units 22 expands out of the cylinder 50 (FIGS. 3, 4 and 10), the first members 42 pivot inwardly toward the farm implement 14 about its connection to the frame 12. As the first members 42 pivot inwardly, the biasing devices 58 exert an inward pull on the second members 44, thereby causing them to pivot about their connection to the first members 42. As the first members 42 pivot into a position parallel to the side of the farm implement 14, the second members 44 continue to pivot (FIG. 3) and come to rest in a position parallel to the side of the farm implement and adjacent to the first members 42 (FIGS. 4 and 10).

The folding adjustment devices 78 (FIGS. 8–10) prevent the expansion of the biasing devices 58, thus causing the biasing devices 58 to exert an inwardly directed force on the second members 44. If the length of the biasing devices 58 is not controlled, the second members 44 would remain in the extended positon and parallel to the first members 42. However, due to the increase in length between the outward end of the strut bracket 64 (FIG. 10) and the point of connection of the biasing device 58 to the second members 44 as the first members 42 pivot inward and the restricted expansion of the biasing device 58, an inwardly directed force results. Thus, the folding of the second members 44 parallel to the first members 42 result. It is to be understood, however, that the biasing device 58 including members 60 and 72 can be a solid linkage and still be operative.

Therefore, as can be readily seen, the booms 16 and 18 of the spraying apparatus 10 may be easily moved between the retracted and extended position while also having a vertical control. By mounting the hydraulic controls at a point accessable to the operator of the tractor, the changes in the position of the booms 16 and 18 may be made during the actual spraying operation. Further, with the booms 16 and 18 in the transport position, the spraying apparatus 10 requires no more space for maneuvering than that of a typical farm trailer, thereby permitting it to be easily moved from field to field and add to safely travel on a highway.

Obviously many modifications and variations of the present invention are possible in light of the above teachings. It is therefore to be understood that, within the scope of the appended claims, the invention may be practiced otherwise than as specifically described.

I claim:

1. Spraying apparatus for spraying a liquid, comprising:
   a frame;
   a first elongated member;
   means for pivotally connecting one end of said first elongated member to said frame along a substantially vertical axis;
   a second elongated member;
   means for pivotally connecting one end of said second elongated member to the other end of said first elongated member along a substantially vertical axis;
   spraying means attached to said first and second members for spraying a fluid;
   actuating means attached to said frame and to said first and second members for moving said first and second members between an extended and a retracted position, in said extended position for spraying said first and second members extending in a direction substantially transverse to the normal direction of travel of the spraying apparatus; and, in said retracted position, the first and second members being folded together and being each substantially in line with the direction of movement of the spraying apparatus, for transportation from place to place; said actuating means including a strut means pivotally connected to said frame and to said second member;
   said actuating means further comprises means connected to said strut means for biasing said second member to said extended position in one position of said actuating means, and biasing said second member to said retracted position in another position of said actuating means; and
   said strut means comprising a first portion pivotally attached at one end thereof to said second member, an abutment member rigidly attached to said first portion, a second portion pivotally attached at one end thereof to said frame, an abutment portion disposed on said second portion, said biasing means comprising a coil compression spring disposed around said first portion and in abutment with said abutment member and said abutment portion, one of said first and second portions being reciprocally connected to the other of said first and second portions and means for limiting the amount of relative reciprocal movement between the first and second portions comprising:
   a rod connected to said first portion at one end thereof and slideably connected to the second portion at the other end thereof.

2. Spraying apparatus as defined in claim 1, wherein said actuating means further comprises a lever rigidly attached to said first member; and
   a hydraulic cylinder pivotally connected at one end to said lever and pivotally connected at its other end to said frame.

3. Spraying apparatus as defined in claim 1 including a farm implement and further comprising:

means for connecting said frame to said farm implement; and means for adjusting the vertical position of the frame with respect to said implement.

4. Spraying apparatus as defined in claim 3, wherein said vertical adjusting means includes a hydraulic cylinder operably connected to said frame and to said farm implement.

5. Spraying apparatus as defined in claim 4, wherein said connecting means between said frame and said farm implement includes at least two upright supporting members rigidly secured to the farm implement in a spaced relationship;

a pair of cross-members horizontally disposed in a spaced relationship and rotatably received by each of said supporting members; and levers rigidly connected to each end of said cross-members and pivotally secured to said frame.

6. Spraying apparatus as defined in claim 1 and further comprising:

a third elongated member;

means for pivotally connecting one end of said third elongated member to said frame along a substantially vertical axis;

a fourth elongated member;

means for pivotally connecting one end of said fourth elongated member to the other end of said third elongated member along a substantially vertical axis;

second spraying means attached to said third and fourth members for spraying a fluid; and second actuating means attached to said frame and to said third and fourth members for moving said third and fourth members between an extended and a retracted position; in said extended position for spraying, said third and fourth members extending in a direction substantially transverse to the normal direction of travel of the spraying apparatus, and in said retracted position, said third and fourth members being folded together and being each substantially in line with the direction of movement of the spraying apparatus, for transportation from place to place.

7. Spraying apparatus as defined in claim 6, wherein said second actuating means includes a second strut member pivotally connected to said frame and to said fourth member.

8. Spraying apparatus as defined in claim 7, wherein said second actuating means comprises:

a second lever rigidly attached to said third member; and a second hydraulic cylinder pivotally connected at one end to said second lever and pivotally connected at its other end to said frame.

9. Spraying apparatus as defined in claim 8, wherein said second actuating means further comprises means connected to said second strut member for biasing said fourth member to said extended position in one position of said second actuating means, and biasing said fourth member to said retracted position in another position of said second actuating means.

10. Spraying apparatus as defined in claim 9, wherein said second biasing means for biasing said fourth member to said extended position is a second resilient element operably connected to said second strut member, thereby causing said second strut member to exert outward pressure on said fourth member in the extended position thereof.

11. Spraying apparatus as defined in claim 10, wherein said means for biasing said fourth member to said retracted position is a second rod coupled between the outward end of said second resilient element and said frame.

12. Spraying apparatus as defined in claim 1 wherein said rod has an enlarged head at one end thereof and a threaded nut assembly adjustably disposed on the other end thereof, whereby said first and second portions can reciprocate with respect to said rod but are prevented from being pulled completely apart.

* * * * *